(12) United States Patent
Niu et al.

(10) Patent No.: US 10,160,653 B2
(45) Date of Patent: Dec. 25, 2018

(54) METHOD OF PRODUCING GRAPHENE-BASED MATERIALS, OBTAINABLE MATERIALS AND THEIR USE

(71) Applicant: City University of Hong Kong, Kowloon (HK)

(72) Inventors: Xinrui Niu, Kowloon (HK); Yonglong Hu, Kowloon (HK); Jijung Kai, Shatin (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 119 days.

(21) Appl. No.: 15/168,520

(22) Filed: May 31, 2016

(65) Prior Publication Data

US 2017/0341937 A1     Nov. 30, 2017

(51) Int. Cl.
*C01B 32/164*     (2017.01)
*C01B 32/184*     (2017.01)
*C01B 32/90*      (2017.01)

(52) U.S. Cl.
CPC .......... *C01B 32/184* (2017.08); *C01B 32/90* (2017.08)

(58) Field of Classification Search
CPC ............ C01B 31/0438; C01B 31/0446; C01B 31/0469
See application file for complete search history.

(56) References Cited

U.S. PATENT DOCUMENTS

| 8,747,623 B2 * | 6/2014 | Zhamu | ............. B82Y 40/00 204/157.43 |
| 2014/0178289 A1* | 6/2014 | Worsley | ............. H01B 1/04 423/448 |
| 2015/0132654 A1 | 5/2015 | Yeon et al. | |

FOREIGN PATENT DOCUMENTS

| CN | 103663438 A | * | 3/2014 |
| CN | 103663438 A | | 8/2015 |
| CN | 104843677 A | | 8/2015 |
| CN | 104846377 A | * | 8/2015 |

OTHER PUBLICATIONS

Berger, Claire, et al. "Electronic confinement and coherence in patterned epitaxial graphene." Science 312.5777 (2006): 1191-1196.*

* cited by examiner

*Primary Examiner* — Richard M Rump
(74) *Attorney, Agent, or Firm* — Renner Kenner Greive Bobak Taylor & Weber

(57) ABSTRACT

A method of producing a graphene-based material, namely a direct sonication assisted method for producing a graphene-based material, in particular comprising 2D porous graphene includes subjecting a mixture of at least one carbide compound and at least one etching compound to sonication. This method enables the production of large amounts of a graphene-based material in a short time at ambient temperature and pressure and without the need for toxic reactants. The obtained porous graphene-based material has excellent electrical conductivity, due to the direct chemical synthesis, and is free of any template and not attached to any substrate. The 2D porous graphene can be directly used without transfer processes. The invention further relates to the graphene-based material obtained or obtainable by the method and the use of the graphene-based material.

16 Claims, 1 Drawing Sheet

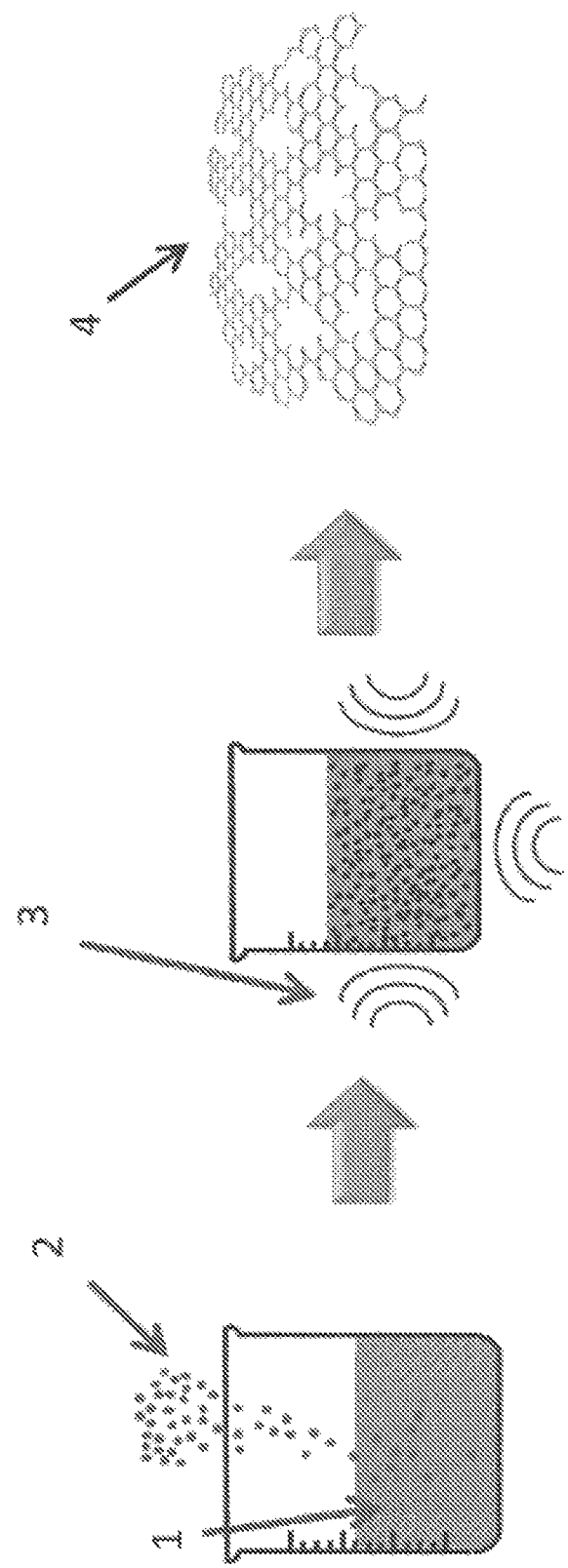

METHOD OF PRODUCING GRAPHENE-BASED MATERIALS, OBTAINABLE MATERIALS AND THEIR USE

TECHNICAL FIELD

The present invention provides a method of producing a graphene-based material, namely a direct sonication assisted method for synthesizing a graphene-based material, in particular a nanoporous 2D graphene. The method comprises etching at least one carbide compound in the presence of at least one etching compound assisted by sonication. The invention further relates to the graphene-based material obtained or obtainable by the method and the use of the graphene-based material.

BACKGROUND OF THE INVENTION

Basically, graphene is a two-dimensional (2D) material with exceptional properties. Graphite consists of multiple layers of graphene. Graphene is increasingly of interest for use in a number of applications, such as in flexible electronics, semiconductors and as strengthening agents in advanced materials. This is because graphene possesses a number of unique and desirable properties, including being transparent, strong, light, and represents an excellent conductor of heat and electricity due to ultrahigh electrical and thermal conductivities and outstanding mechanical properties. These properties make it a promising material especially for applications such as for use in sensors, in transistors, in detectors, in advanced batteries, in supercapacitors and for many further non-electronic applications.

Due to the increasing number of possible applications, the market of graphene is a fast growing market with a rapidly rising demand. In general, the market trend is changing towards large-size production. And the technical requirements focus on lower sheet resistances, because Organic Photovoltaic (OPV) devices and Organic Light-emitting Diodes (OLED) are entering the market. So methods suitable to provide large quantities of high quality graphene and related materials are urgently required. However, the large-scale production of graphene becomes a bottleneck in developing graphene and related materials. Various synthesis techniques including bottom-up and top-down methods have been developed and exploited to prepare such materials including materials with various graphene layers, dimensions, shapes, which leads to different qualities of resulting materials. Each of which have various advantages and disadvantages.

Although usual top-down processes like mechanical and chemical exfoliation of graphite or graphite oxide enables the synthesis of graphene related materials on a large scale, the number of graphene layers cannot be sufficiently controlled and although graphite oxide can be reduced to remove the functional groups, this is inevitably accompanied by a number of defects. Further, those methods usually suffer from a low efficiency. For example, production of graphene via steam and metal etching of graphene oxide requires a number of reaction steps and is time consuming with low efficiency and not suitable for large scale fabrication. In particular, the electrical conductivity of the final graphene and graphene related material is limited due to a resulting significant proportion of oxide groups and defects with detrimental effects on the electronic, optical and mechanical properties of the material. So this method can't meet today's requirements either. Dry exfoliation is usually time consuming and does not allow for large scale production, too.

Furthermore, the above processes are quite complicated. In comparison, few-layer graphene films have been produced via bottom-up processes like chemical vapor deposition on copper foils and films. Although this method can produce high quality graphene and related materials, its large-scale production is limited due to high energy consumption, high costs and many resulting defects which might affect the electrical conductivity of the resulting materials. Production of graphene by epitaxial growth is significantly limited by high quality substrate requirements, high temperatures of usually more than 200° C. up to more than 1200° C. and harsh conditions.

For example, U.S. Ser. No. 14/539,269 discloses a method of preparing graphene and graphene related materials, respectively, comprising exposing a highly crystalline carbide to a halogen-containing gas at temperatures of at least 200° C. to 1200°, treating the resulting carbide-derived carbon with an acid to form carbon oxide and subsequently reducing the carbon oxide. CN104843677 refers to a method of manufacturing a graphene related material, wherein graphite is dispersed in water with chitosan and acetic acid. Chitosan acts as the chemical for exfoliation. CN103663438 discloses a method of manufacturing a graphene and graphene related materials, respectively, starting from graphite oxide comprising dispersing obtained graphene oxide with sonication in the presence of a strong acid. The resulting product is porous graphene oxide which needs to be reduced in a further reaction step. It is evident that such methods require a number of reactions steps and are time consuming, not environmentally friendly and/or need expensive materials, equipment and harsh conditions or they do not provide graphene and related materials with sufficient quality.

There remains a strong need for a production process that is capable of producing large volumes of high quality graphene and/or related materials suitable for large scale industrial production which meet today's or future's requirements and a strong need for respective resulting graphene and/or related materials.

SUMMARY OF THE INVENTION

In a first aspect, the invention provides a method of producing a graphene-based material, preferably comprising graphene sheets in particular graphene monolayers (2D graphene), comprising steps of:
  (i) providing a mixture of at least one carbide compound and at least one etching compound in the presence of a reaction solvent;
  (ii) subjecting the mixture of step (i) to sonication at at least one frequency above 15 kHz for forming the graphene-based material.

The carbide compound is in particular selected from aluminium carbide, iron carbide, zirconium carbide, titanium carbide, hafnium carbide, vanadium carbide, niobium carbide, tantalum carbide, chromium carbide, molybdenum carbide, silicon carbide, tungsten carbide and a metal carbide compound having at least two elements selected from aluminium, iron, zirconium, titanium, hafnium, vanadium, niobium, tantalum, chromium, molybdenum, silicon or tungsten.

The etching compound is in particular selected from an acid, in particular an inorganic acid such as hydrochloric acid, nitric acid or sulfuric acid or a base, in particular a metal hydroxide such as sodium hydroxide, potassium hydroxide, calcium hydroxide or barium hydroxide.

Step (i) of the method of the present invention in particular comprises steps of:
a) providing a mixture, in particular a solution, of the at least one etching compound and the reaction solvent;
b) adding the at least one carbide compound to the mixture of step a);
c) mixing the mixture obtained in step b).

Sonication in step (ii) of the method of the present invention is in particular carried out at at least one, in particular one frequency of at least 20 kHz, in particular with a frequency of from 20 kHz to 400 kHz at an ambient temperature and pressure for 5 min to 72 h and with an output energy in particular of 10 W/cm$^2$ to 200 W/cm$^2$.

Under the conditions of the method of the present invention, a graphene-based material with exceptional properties is obtained.

The method of the present invention may further comprise a step (iii) comprising:
isolating the graphene-based material from the further components present in the mixture after carrying out step (ii);
purifying the graphene-based material; and/or
drying the graphene-based material.

In particular, step (iii) comprises at least isolating the graphene-based material from the further components present in the mixture after carrying out step (ii) and purifying the isolated graphene-based material.

Further steps of modifying the graphene-based material such as by graphene doping, graphene functionalization and/or dispersing the graphene-based material in a matrix might be carried out.

In another aspect, the present invention refers to a graphene-based material obtained or obtainable with the method described above, preferably comprising nanoporous graphene monolayers (2D graphene) which preferably have an average pore size of less than 30 nm.

Further in accordance with the present invention is the use of the graphene-based material obtained or obtainable with the method described above in the production of one of electronic circuits, energy-storage materials, electrically conductive films, chemical sensors, optical materials, optoelectronic devices, composite materials, batteries, membranes, polymers, catalysts, inks or coatings.

The direct and sonication assisted method of the present invention enables the production of different graphene-based materials with high porosity, in a large amount, in a short time and even under mild conditions, i.e. at room temperature and atmospheric pressure. The method does not require toxic reactants, which is highly advantageous compared to methods known up to now and the whole process will not harm the environment and/or the amount of chemicals required is significantly reduced. As key feature of the present invention, sonication of a mixture of carbide compound and etching compound allows direct production of graphene-based materials such as 2D porous graphene without the need for further reduction steps as in presently known methods. Compared to reduced porous graphene from porous graphene oxide as in prior art methods, the graphene-based material of the present invention has an excellent electrical conductivity due to the direct chemical synthesis. The use of carbides as starting materials further contributes to a cost-effective method, as carbides are cheap and can be easily synthesized in many ways. The method further allows the production of various graphene-based materials and is suitable for industrial scale production.

In the present method, sonication provides the local reaction environment allowing the formation of the graphene-based material instead of the usual exfoliation environment requiring harsh conditions or toxic chemicals as in methods commonly used. The requirements regarding the equipment are reduced with the method of the present invention and the process can be easily controlled.

A further significant advantage of the method of the present invention is that unlike known methods, the graphene-based material, in particular the 2D porous graphene obtained is free of any template and not attached to any substrate. So the graphene-based materials like the 2D porous graphene can be directly used without further transfer processes.

BRIEF DESCRIPTION OF THE DRAWINGS

FIG. 1 is a schematic representation of an embodiment of the method of the present invention.

DESCRIPTION OF THE EMBODIMENTS

The following preparations and examples are given to enable those skilled in the art to more clearly understand and to practice the present invention. They should not be considered as limiting the scope of the invention, but merely as being illustrative and for representing preferred embodiments thereof. The technical terms used in the present patent application have the meaning as commonly understood by a respective skilled person unless specifically defined otherwise.

As used herein and in the claims, "comprising" means including the following elements but not excluding others. "Essentially consisting of" means that the material consists of the respective element along with usually and unavoidable impurities such as side products and components usually resulting from the respective preparation or method for obtaining the material such as traces of further components or solvents. "Consisting of" means that the material solely consists of, i.e. is formed by the respective element.

The invention provides in a first aspect a method of producing a graphene-based material comprising steps of:
(i) providing a mixture of at least one carbide compound and at least one etching compound in the presence of a reaction solvent;
(ii) subjecting the mixture of step (i) to sonication at at least one frequency above 15 kHz for forming the graphene-based material.

The term "graphene-based material" generally refers to a material comprising graphene, i.e. comprising two-dimensional carbon structures in which the carbon atoms are arranged in a honeycomb-like manner usually in a hexagonal structure. In this honeycomb-like structure, each carbon atom is, except in the peripheral regions, surrounded by three further carbon atoms forming an essentially sheet-like structure. The term graphene-based material in particular encompasses graphene monolayers (2D graphene), i.e. single graphene monolayers. The term graphene-based material as used herein also encompasses few-layer graphene with more than one graphene layer (3D graphene) like bilayer graphene, trilayer graphene up to multi-layer graphene such as graphite. "Few-layer graphene" as used herein means up to 9 layers. For the purposes of the invention, the term graphene-based material refers to structures which in particular encompass graphene monolayers and few-layer graphene.

Graphene monolayers, few-layer graphene and multi-layer graphene are herein collectively called "graphene sheets".

In particular, few-layer graphene which is up to 9 layers of graphene, i.e. up to 9 graphene mono-layers thick, can be obtained with the method of the present invention, which layers are usually bound by van der Waals forces. The number of layers depends on the particular conditions of the method such as the carbide compound used, the output energy during sonication and the sonication time. Hence, the graphene-based material produced with the method of the present invention in particular comprises and more preferably essentially consists of graphene sheets, more preferably with up to 9 layers. In embodiments of the present invention, the graphene-based material comprises graphene monolayers (2D graphene). In other embodiments of the present invention, the graphene-based material comprises few-layer graphene, in particular with 2 to 9 layers. In further preferred embodiments of the present invention, the graphene-based material comprises graphene monolayers and few-layer graphene with 2 to 9 layers. In particular embodiments of the present invention, the graphene-based material essentially consists of graphene monolayers and few-layer graphene with 2 to 9 layers.

The term "carbide compound" as used herein refers to a carbide, which is understood by a person skilled in the art for being composed of carbon and at least one less electronegative element, i.e. at least one element with a lower tendency to attract electrons (or electron density) towards itself compared to carbon, namely a metallic or semi metallic element. Carbides are usually classified by their chemical bonding type. A "carbide compound" according to the invention is composed of carbon and at least one metallic or semimetallic element in particular an element selected from groups 4 (titanium family), 5 (vanadium family), 6 (chromium family), 8 (iron family), 13 (boron family) or 14 (carbon family) in the periodic table according to the present IUPAC nomenclature. This corresponds to groups IVA, VA, VIA, VIIIA, IIIB and IVB according to the former group numbering system called "old IUPAC". If reference is made to the periodic table below in this patent application, this always refers to the present IUPAC numbering. Optionally, at least a further metal or semi metal in particular of groups 2 to 14 in the periodic table may be present in the carbide compound, thus forming a ternary carbide.

Preferred elements of group 4 in the periodic table include zirconium, titanium or hafnium. Preferred elements of group 5 in the periodic table include vanadium, niobium or tantalum. Preferred elements of group 6 in the periodic table include chromium, molybdenum or tungsten. The element of group 8 in the periodic table is preferably iron. The preferred element of group 13 in the periodic table is aluminium. The preferred element of group 14 in the periodic table is silicon.

The carbide compound can, in particular, be a compound of carbon and an element selected from groups 4, 5, 6, 8, 13 or 14 in the periodic table or a compound of carbon and at least two different elements selected from groups 4, 5, 6, 8, 13 and 14 in the periodic table. The element is more preferably selected from aluminium, iron, zirconium, titanium, hafnium, vanadium, niobium, tantalum, chromium, molybdenum, silicon or tungsten.

Most preferably, the carbide compound is selected from the group consisting of aluminium carbide, iron carbide, zirconium carbide, titanium carbide, hafnium carbide, vanadium carbide, niobium carbide, tantalum carbide, chromium carbide, molybdenum carbide, silicon carbide, tungsten carbide and a carbide compound composed of carbon and at least two different elements selected from aluminium, iron, zirconium, titanium, hafnium, vanadium, niobium, tantalum, chromium, molybdenum, silicon or tungsten. The carbide compound can, for example, have one of the following formulas: $SiC$, $SiC_4$, $SiC_6$, $Ti_xC_y$ such as $TiC$, $Hf_xC_x$ such as $HfC$, $Zr_xC_y$ such as $ZrC$, $Al_xC_y$ such as $Al_4C_3$, $Fe_xC_y$ such as $Fe_3C$, $Fe_7C_3$ and/or $Fe_2C$, $V_xC_y$ such as $VC$ or $V_4C_3$, $Nb_xC_y$ such as $NbC$, $Nb_2C$ and/or $Nb_4C_3$, $Ta_xC_y$ such as $TaC$ and/or $Ta_4C_3$, $Cr_xC_y$ such as $Cr_3C$, $Cr_3C_2$, $Cr_7C_3$, $Cr_{23}C_6$, $Mo_xC_y$ such as $Mo_2C$ and/or $Mo_3C_2$ and $W_xC_y$ such as $WC$, wherein x and y may be determined stoichiometrically. Further preferred, the carbide compound has one of the following formulas: $SiC$, $TiC$, $HfC$, $ZrC$, $Al_4C_3$, $Fe_3C$, $VC$, $NbC$, $TaC$, $Cr_3C$, $Mo_2C$ or $WC$.

In embodiments of the present invention, at least two and preferably more than two carbide compounds are used in step (i), preferably two or more independently selected from the group consisting of aluminium carbide, iron carbide, zirconium carbide, titanium carbide, hafnium carbide, vanadium carbide, niobium carbide, tantalum carbide, chromium carbide, molybdenum carbide, silicon carbide, tungsten carbide and a carbide compound composed of carbon and at least two elements selected from aluminium, iron, zirconium, titanium, hafnium, vanadium, niobium, tantalum, chromium, molybdenum, silicon or tungsten.

The carbide compound preferably is composed of particles with an average diameter of at most 50 μm such as of from 2 nm to 50 μm. Unless otherwise specified, "diameter" as used for particles in the present patent application preferably refers to the Feret (or Feret's) diameter at the thickest point of such particle. The Feret diameter is a measure of an object size along a specified direction and can be defined as the distance between the two parallel planes restricting the object perpendicular to that direction. The Feret diameter can be determined, for example, with microscopic methods or scanning electron microscopy. I.e. if the Feret diameters measured for the different directions of the particle differ, the "diameter" referred to in the present patent application always means the highest value measured, i.e. the maximum Feret diameter measured. "Average diameter" refers to the average of "diameter" preferably measured with at least 10 particles, more preferably at least 20 particles.

More preferably, the particles of the carbide compound are nanoparticles, i.e. the carbide compound is composed of particles having an average diameter of less than 1000 nm such as 2 nm to less than 1000 nm, further preferred of less than 500 nm such as 2 nm to less than 500 nm.

The carbide compound and/or the particles forming the carbide compound may have different shapes, in particular at least one of a sphere, a whisker, a platelet, a tube, a fiber, a rod, a sheet, a flake or an irregular shape.

The "etching compound" as used herein is a compound suitable to etch the carbide compound in order to form the graphene-based material under the conditions of the method of the present invention. The "etching compound" is in particular selected from an acid or a base.

Acids as commonly understood are generally compounds acting as proton donor, which are usually able to decrease the pH of an aqueous solution. Bases are generally known as compounds able to take up a proton from an acid or able to give up an unshared pair of electrons to an acid which usually raise the pH of an aqueous solution.

Acids as used herein include inorganic and organic acids and mixtures thereof. Any inorganic acid, organic acid or mixture thereof which is suitable to etch the carbide compound in order to form the graphene-based material under the conditions of the method of the present invention can be used. The term "inorganic acid" as used herein, refers to an acid that does not contain carbon. Inorganic acids generally include sulfuric acid, hydrochloric acid, perchloric, acid, nitric acid, phosphoric acid, and the like. Preferred inorganic acids are selected from hydrochloric acid (HCl), nitric acid ($HNO_3$) or sulfuric acid ($H_2SO_4$). Organic acids include carboxylic acids, for example, acetic acid ($CH_3COOH$) and the like. In preferred embodiments, the acid is selected from hydrochloric acid, nitric acid, sulfuric acid or acetic acid, still more preferably from hydrochloric acid, nitric acid or sulfuric acid.

Bases in particular include metal hydroxides. Any metal hydroxide suitable to etch the carbide compound in order to form the graphene-based material under the conditions of the method of the present invention can be used. The term "metal hydroxide" as used herein and commonly understood by a skilled person refers to a compound containing the hydroxide ion ($OH^-$) and at least one, usually one metal ion in particular selected from the groups 1, 2 or 13 in the periodic table, more preferably from groups 1 or 2 in the periodic table. I.e. the metal hydroxide is preferably an alkali metal hydroxide or an alkaline earth metal hydroxide. Hence, the base is preferably a hydroxide of an alkali metal selected from group 1 of the periodic table, in particular sodium or potassium, or an alkaline earth metal selected from group 2 of the periodic table, in particular calcium or barium. The base is more preferably selected from the group consisting of sodium hydroxide, potassium hydroxide, calcium hydroxide and barium hydroxide. In especially preferred embodiments, the base is selected from the group consisting of sodium hydroxide or potassium hydroxide.

In embodiments of the present invention, at least two and in particular more than two etching compounds are used in step (i), i.e. two or more acids, in particular two or more inorganic acids for example independently selected from hydrochloric acid, nitric acid or sulfuric acid, or two or more bases, in particular two or more metal hydroxides for example independently selected from sodium hydroxide, potassium hydroxide, calcium hydroxide or barium hydroxide.

The reaction solvent could be any solvent suitable to dissolve or disperse the at least one carbide compound and/or the at least one etching compound, in particular any solvent suitable to dissolve the at least one etching compound and to disperse the at least one carbide compound. The solvent preferably contains water and/or at least one aliphatic alcohol. The aliphatic alcohol can be a monohydric alcohol, i.e. with one hydroxyl group, and preferably has 2 to 3 carbon atoms, i.e. is preferably selected from ethanol, n-propanol or isopropanol. Preferably, the reaction solvent comprises and in particular essentially consists of water like deionized water.

Step (i) of the method of the present invention preferably comprises steps of:
a) providing a mixture, in particular a solution, of the at least one etching compound and the reaction solvent;
b) adding the at least one carbide compound to the mixture of step a);
c) mixing the mixture obtained in step b).

Step c) may be carried out with a high speed mixer, a magnetic mixer, an ultrasonicator and/or by manual mixing.

The mixture obtained in step a) preferably has a total concentration of etching compound in a range of from 0.01 mol/L to 15 mol/L, more preferably in a range of from 0.03 mol/L to 14 mol/L. The mixture in step a) in particular has an acidic or alkaline pH depending on the kind of etching compound, i.e.:

a pH of lower than 7 in case the at least one etching compound is at least one acid, in particular at least one acid selected from hydrochloric acid, nitric acid, acetic acid or sulfuric acid, further preferred selected from hydrochloric acid, nitric acid or sulfuric acid; or a pH of above 7 in case the at least one etching compound is at least one base, in particular at least one base selected from sodium hydroxide, potassium hydroxide, calcium hydroxide or barium hydroxide.

The mixture in step (i) preferably essentially consists of at least one carbide compound, at least one etching compound and the reaction solvent. I.e. no further additive like a surfactant or dispersion agent is present in the mixture in step (i).

"Sonication" generally refers to the irradiation of a liquid sample, presently the mixture of step (i), with sound energy resulting in agitation. Preferably, the sonication in step (ii) is ultrasonication, i.e. the irradiation of a liquid sample, presently the mixture of step (i), with ultrasonic (at least 20 kHz) waves resulting in agitation and significantly enforcing etching of the carbide compound for forming the graphene-based material. Sound waves propagating into the liquid media result in alternating high-pressure (compression) and low-pressure (rarefaction) cycles. High-intensity sonic waves may create small vacuum bubbles or voids in the liquid, which then collapse violently (cavitation) during compression, creating increased local temperatures.

Sonication in step (ii) is preferably carried out at at least one, in particular one frequency of at least 20 kHz, in particular with a frequency of from 20 kHz to 400 kHz such as 20 kHz to 250 kHz. In a particular embodiment, the frequency is about 20 kHz. Such frequencies are especially suitable in the method of the present invention in order to etch the carbide compound. Step (ii) can be carried out at an ambient temperature and pressure, i.e. step (ii) is preferably carried out at a temperature between 20° C. and 30° C., more preferably at about 25±2° C., and preferably a pressure of about 0.1 MPa. Sonication is preferably carried out for 5 min to 72 h depending on, for example, the quantity of carbide compound and the desired result. In a particular embodiment, sonication is carried out for about 2 h.

Preferably, sonication is carried out by means of an ultrasonic generator and ultrasonicator, respectively. The output energy is preferably 10 W/cm² to 200 W/cm². In a particular embodiment, the output energy is about 100 W/cm².

The inventors unexpectedly found that under the conditions of the method of the present invention, high amounts of graphene-based material with superior properties and quality can be provided. It is assumed that the following reaction mechanism might be involved in the formation of the graphene-based material in case the at least one etching compound is at least one acid:

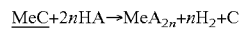

Me is a semi metal or metal, MeC is the carbide compound and HA is an inorganic acid.

It is assumed that the following reaction mechanism might be involved in the formation of the graphene-based material in case the at least one etching compound is at least one base:

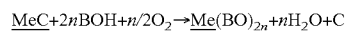

BOH is a metal hydroxide.

The method of the present invention preferably further comprises a step (iii) after step (ii) comprising:
isolating the graphene-based material from the further components present in the mixture after step (ii);
purifying the graphene-based material; and/or
drying the graphene-based material.

Preferably, step (iii) comprises at least one and further preferably both of isolating the graphene-based material from the further components present in the mixture after carrying out step (ii) and purifying the graphene-based material.

Isolating the graphene-based material from the further components present in the mixture after step (ii) can be carried out by centrifuging, filtering such as by means of membrane filtration, decanting, precipitating the graphene-based material with a precipitating agent and/or solvent evaporation such as by means of drying like vacuum drying such as at $10^{-2}$ mbar for 0.5 h to 2 h. Precipitating agents may include diethyl ether, hexane or toluene or mixtures thereof. In especially preferred embodiments, the graphene-based material is isolated from the further components present in the mixture after step (ii) by centrifuging.

Purifying the graphene-based material preferably comprises contacting the graphene-based material with a purifying solvent, in particular washing it with the purifying solvent. "Washing" includes contacting the graphene-based material with a purifying solvent and subsequently isolating the graphene-based material from the purifying solvent such as by centrifuging, filtering or decanting.

The purifying solvent is preferably selected from at least one of water, an aliphatic alcohol, a cyclane, a ketone or mixtures thereof. In embodiments, in which the purifying solvent comprises water, deionized water is preferably used. An aliphatic alcohol suitable for the purifying solvent is preferably selected from mono- or dihydric alcohols, i.e. alcohols with one or two hydroxyl groups, further preferably a mono- or dihydric alcohol with 1 to 5 carbon atoms, more preferably a mono- or dihydric alcohol with 1 to 4 carbon atoms, most preferably methanol, ethanol, n-propanol, isopropanol, n-butanol, isobutanol, sec-butyl alcohol, tert-butyl alcohol, ethylene glycol or mixtures thereof. Cyclanes are cyclic alkanes. A preferred ketone is a dialkylketone, i.e. having a carbonyl group (a carbon-oxygen double bond) and two alkyl groups attached to the carbonyl group independently having 1 to 3 carbon atoms, more preferably a dialkylketone with a total of 2 to 5 carbon atoms, most preferably acetone, butanone or mixtures thereof.

Preferably, the purifying solvent is selected from deionized water, methanol, ethanol, n-propanol, isopropanol, n-butanol, isobutanol, sec-butyl alcohol, tert-butyl alcohol, ethylene glycol, a cyclane, acetone, butanone or mixtures thereof, further preferred from deionized water, methanol, ethanol, n-propanol, isopropanol, n-butanol, isobutanol, sec-butyl alcohol, tert-butyl alcohol, ethylene glycol, acetone or butanone or mixtures thereof. In especially preferred embodiments, the purifying solvent comprises and in particular essentially consists of ethanol.

The graphene-based material is preferably contacted with the purifying solvent up to 10 times. In embodiments of the present invention, the graphene-based material is washed with the purifying solvent at least 2 times up to 10 times, i.e. the graphene-based material is contacted with a first part of the purifying solvent and subsequently the graphene-based material is isolated from the purifying solvent, then the thus obtained graphene-based material is again contacted with a second part of the purifying agent and the graphene-based material is isolated from the purifying solvent and so on. In especially preferred embodiments, the graphene-based material is washed with the purifying solvent 5 times.

Drying the graphene-based material may include application of an increased temperature or solvent evaporation such as by means of vacuum drying at $10^{-2}$ mbar for 0.5 h to 2 h and/or by means of freeze drying. In one embodiment of the present invention, drying the graphene-based material is carried out by means of vacuum drying at $10^{-2}$ mbar for 0.5 h to 2 h. In another embodiment of the present invention, drying the graphene-based material is carried out by means of freeze drying.

In another aspect, the present invention refers to a graphene-based material, obtained or obtainable with the method described above for producing a graphene-based material. In one embodiment, the present invention refers to a graphene-based material obtained, in particular directly obtained, with the method described above. In one embodiment, the present invention refers to a graphene-based material obtainable with the method described above. The graphene-based material in particular comprises graphene sheets and preferably comprises graphene monolayers (2D graphene). The graphene-based material may further or alternatively comprise few-layer graphene like bilayer graphene, trilayer graphene up to few-layer graphene with up to 9 layers (3D graphene). The graphene-based material preferably comprises and further preferably essentially consists of graphene sheets having 1 and 9 layers of graphene. The number of layers can be determined by means of Transmission Electron Microscopy or Raman Spectroscopy. In particular, the graphene-based material is substantially crystalline, i.e. more than 50% and in particular more than 80% crystalline, which can be confirmed with Transmission Electron Microscopy.

The graphene-based material obtained or obtainable, i.e. preferably the graphene sheets, may have lateral dimensions up to 20 μm×20 μm and a height up to 100 nm. The graphene-based material obtained or obtainable is preferably a nanoporous graphene, namely the average pore size is in the nanometer range, i.e. below 1000 nm. More preferably, the graphene-based material comprises and in particular essentially consists of graphene sheets having an average pore size of less than 30 nm, in particular of 0.5 nm to 30 nm, further preferably of 0.5 nm to 20 nm. "Average pore size" refers to the average of "pore size" of the graphene-based material preferably measured with at least 20, more preferably 100 randomly selected components of the graphene-based material, in particular graphene sheets. I.e. the pore size of one pore of at least 20, preferably at least 100 randomly selected graphene sheets is preferably determined. The pore size is preferably measured with Transmission Electron Microscopy, wherein the term "pore size" as used herein means the maximum direct distance between two points on the pore, namely two points at outer edges of the pore.

In particular, the graphene-based material obtained or obtainable comprises and further preferably essentially consists of graphene sheets having average lateral dimensions of less than 1 μm×1 μm, preferably less than 500 nm×500 nm, and an average height of at most 100 nm, preferably at most 10 nm and further preferred at most 3 nm. The dimensions and height are preferably determined with 20 and in particular 100 randomly chosen graphene sheets giving the "average" lateral dimensions and height. The term "lateral dimensions" is used to define the length and width of the surface of the graphene-based material. The "height" depends on the number of distinct graphene layers stacked together. The height of the graphene sheets increases with the number of stacked layers. The determination of the height of the graphene sheets can, for example, be carried out by means of Atomic Force Microscopy or a Transmission Electron Microscopy.

The carbon content of the graphene-based material is preferably above 99%, further preferred above 99.5%, and in particular about 99.95%. The latter can be determined, for example, by means of elemental analysis. The thermal conductivity of the graphene-based material obtained with the method of the present invention is preferably at least 300 $Wm^{-1}K^{-1}$, more preferably at least 1000 $Wm^{-1}K^{-1}$. The specific surface area of the graphene-based material can be of from 100 $m^2/g$ to 3000 $m^2/g$ such as of from 1000 $m^2/g$ to 3000 $m^2/g$. Graphene-based materials with electrical conductivities of at least 100 S/cm, more preferably of at least 200 S/cm, further preferred of more than 200 S/cm and in particular of more than 300 S/cm can be obtained with the method of the present invention. Conductivity measurements can be carried out by means of methods commonly used for graphene and similar materials including Raman Spectroscopy or Atomic Force Microscopy. The oxygen content in the graphene-based material is preferably below 1.0 wt.-%, more preferably below 0.9 wt.-% based on the weight of the graphene-based material. The determination of the oxygen content of the graphene-based material can, for example, be carried out by means of elemental analysis and/or X-ray Photoelectron Spectroscopy (XPS).

Further in accordance with the present invention is the use of the graphene-based material obtained or obtainable with the method described above in the production of electronic articles such as electronic circuits and energy-storage devices like supercapacitors, electrically conductive films, chemical sensors, optical materials, optoelectronic devices, composite materials such as reinforced and/or electrically conductive plastics, batteries and membranes, polymers, catalysts, inks and coatings. Preferred is the use of the graphene-based material obtained or obtainable with the method described above in the production of one of electronic circuits, energy-storage devices, electrically conductive films, chemical sensors, optical materials, optoelectronic devices, composite materials, batteries, membranes, polymers, catalysts, inks or coatings.

EXAMPLES

The compounds used in the method, i.e. the carbide compound, etching compound and reaction solvent, are commercially available and have been bought from Sigma-Aldrich with the commercially available purity. Transmission Electron Microscopy has been carried out with the apparatus JEOL 2100F.

Example 1

Production of 2D Graphene with the Method of the Present Invention by Means of Several Inorganic Acids as Etching Compound An aqueous solution of the inorganic acid in deionized water has been provided, the carbide nanoparticles have been added to the solution and the mixture has been subjected to ultrasound for 2 h with an output energy of 100 $W/cm^2$ and a frequency of 20 kHz.

The experiments have been carried out separately with all of the carbide compounds listed in table 1, wherein for each carbide compound experiments with all etching compounds in table 1 have been carried out.

TABLE 1

| Carbide compounds and etching compounds used in the experiments | |
|---|---|
| Compound | Specific compounds used in the experiments |
| Carbide compound | One of SiC, TiC, HfC, ZrC, $Al_4C_3$, $Fe_3C$, VC, NbC, TaC, $Cr_3C$, $Mo_2C$ or WC |
| Etching compound | One of HCl, $HNO_3$ or $H_2SO_4$ |

A nanoporous 2D graphene has been obtained in all experiments, which has been isolated from the reaction solution by centrifuging and washed with ethanol as purifying agent 5 times. The obtained nanoporous 2D graphene had a pore size of lower than 20 nm determined with Transmission Electron Microscopy.

Example 2

Production of 2D Graphene with the Method of the Present Invention by Means of Several Metal Hydroxides as Etching Compound An aqueous solution of the metal hydroxide in deionized water has been provided, the carbide nanoparticles have been added to the solution and the mixture has been subjected to ultrasound for 2 h with an output energy of 100 $W/cm^2$ and a frequency of 20 kHz.

The experiments have been carried out separately with all of the carbide compounds listed in table 2, wherein for each carbide compound experiments with all etching compounds in table 2 have been carried out.

TABLE 2

| Carbide compounds and etching compounds used in the experiments | |
|---|---|
| Compound | Specific compounds used in the experiments |
| Carbide compound | One of SiC, TiC, HfC, ZrC, $Al_4C_3$, $Fe_3C$, VC, NbC, TaC, $Cr_3C$, $Mo_2C$ or WC |
| Etching compound | One of sodium hydroxide or potassium hydroxide |

A nanoporous 2D graphene has been obtained in all experiments, which has been isolated from the reaction solution by centrifuging and washed with ethanol as purifying agent 5 times. The obtained nanoporous 2D graphene had a pore size of lower than 20 nm determined with Transmission Electron Microscopy.

LIST OF REFERENCE SIGNS

1 Etching compound in reaction solvent
2 Carbide compound
3 Ultrasonication
4 Nanoporous 2D graphene

The invention claimed is:
1. A method of producing a graphene-based material comprising steps of:
   (i) providing a mixture of at least one carbide compound and at least one etching compound in the presence of a reaction solvent;
   (ii) subjecting the mixture of step (i) to sonication at at least one frequency above 15 kHz for forming the graphene-based material.
2. The method of claim 1, wherein the graphene-based material comprises graphene monolayers.

3. The method of claim 1, wherein the carbide compound is selected from aluminium carbide, iron carbide, zirconium carbide, titanium carbide, hafnium carbide, vanadium carbide, niobium carbide, tantalum carbide, chromium carbide, molybdenum carbide, silicon carbide or tungsten carbide.

4. The method of claim 1, wherein the carbide compound comprises at least two different elements selected from aluminium, iron, zirconium, titanium, hafnium, vanadium, niobium, tantalum, chromium, molybdenum, silicon or tungsten.

5. The method of claim 1, wherein the carbide compound is composed of particles with an average diameter of from 2 nm to 50 µm.

6. The method of claim 5, wherein the carbide compound is composed of particles with an average diameter of less than 1000 nm.

7. The method of claim 1, wherein the etching compound is an inorganic acid selected from hydrochloric acid, nitric acid or sulfuric acid.

8. The method of claim 1, wherein the etching compound is a metal hydroxide selected from the group consisting of sodium hydroxide, potassium hydroxide, calcium hydroxide and barium hydroxide.

9. The method of claim 1, wherein step (i) comprises providing a mixture of at least two carbide compounds and at least two etching compounds.

10. The method of claim 1, wherein step (i) comprises steps of:
    a) providing a mixture of the at least one etching compound and the reaction solvent;
    b) adding the at least one carbide compound to the mixture of step a);
    c) mixing the mixture obtained in step b).

11. The method of claim 10, wherein the etching compound is present in the mixture obtained in step a) in a concentration of from 0.01 mol/L to 15 mol/L.

12. The method of claim 1, wherein sonication in step (ii) is carried out at one frequency of from 20 kHz to 400 kHz for 5 min to 72 h and with an output energy of 10 W/cm$^2$ to 200 W/cm$^2$.

13. The method of claim 1, wherein step (ii) is carried out at a temperature between 20° C. and 30° C. and a pressure of about 0.1 MPa.

14. The method of claim 1 with a further step (iii) comprising at least one of:
    isolating the graphene-based material from the further components present in the mixture after carrying out step (ii); or
    purifying the graphene-based material.

15. The method of claim 14, wherein purifying the graphene-based material comprises washing the graphene-based material with a purifying solvent at least 2 times up to 10 times.

16. The method of claim 15, wherein the purifying solvent is selected from deionized water, methanol, ethanol, n-propanol, isopropanol, n-butanol, isobutanol, sec-butyl alcohol, tert-butyl alcohol, ethylene glycol, a cyclane, acetone, butanone or mixtures thereof.

* * * * *